United States Patent [19]

Glowatzki

[11] Patent Number: 4,531,628
[45] Date of Patent: Jul. 30, 1985

[54] CONVEYANCE SYSTEM

[76] Inventor: Waldemar Glowatzki, Dofstr. 27, 3004 Isernhagen 2, Fed. Rep. of Germany

[21] Appl. No.: 568,493

[22] Filed: Jan. 5, 1984

Related U.S. Application Data

[63] Continuation of Ser. No. 187,825, Sep. 15, 1980, abandoned.

[30] Foreign Application Priority Data

Mar. 23, 1980 [DE] Fed. Rep. of Germany ....... 3011875

[51] Int. Cl.³ .............................................. B65G 47/26
[52] U.S. Cl. .................................. 198/432; 198/434; 198/458
[58] Field of Search ............. 198/432, 436, 434, 458, 198/579

[56] References Cited

U.S. PATENT DOCUMENTS

| | | | |
|---|---|---|---|
| 3,254,778 | 6/1966 | Marland et al. | 198/579 |
| 3,570,649 | 3/1971 | Fluck | 198/579 |
| 3,887,060 | 6/1975 | Kamphues | 198/434 |

Primary Examiner—Joseph E. Valenza
Assistant Examiner—Kyle E. Shane
Attorney, Agent, or Firm—Allegretti, Newitt, Witcoff & McAndrews, Ltd.

[57] ABSTRACT

A conveyance system which adjusts the quantitative rate at which items are conveyed independently of the linear velocity at which items are conveyed while the conveyance operation is on-going, is disclosed. The conveyance system includes a roller section that receives the items being conveyed at a first conveyance velocity, a positioning device that moves the items lateral to the direction of conveyance, a control device that controls the rate of operation of the positioning device, and a second roller section that includes a gear box which adjusts the linear conveyance velocity of and the spacing between the items being conveyed.

9 Claims, 12 Drawing Figures

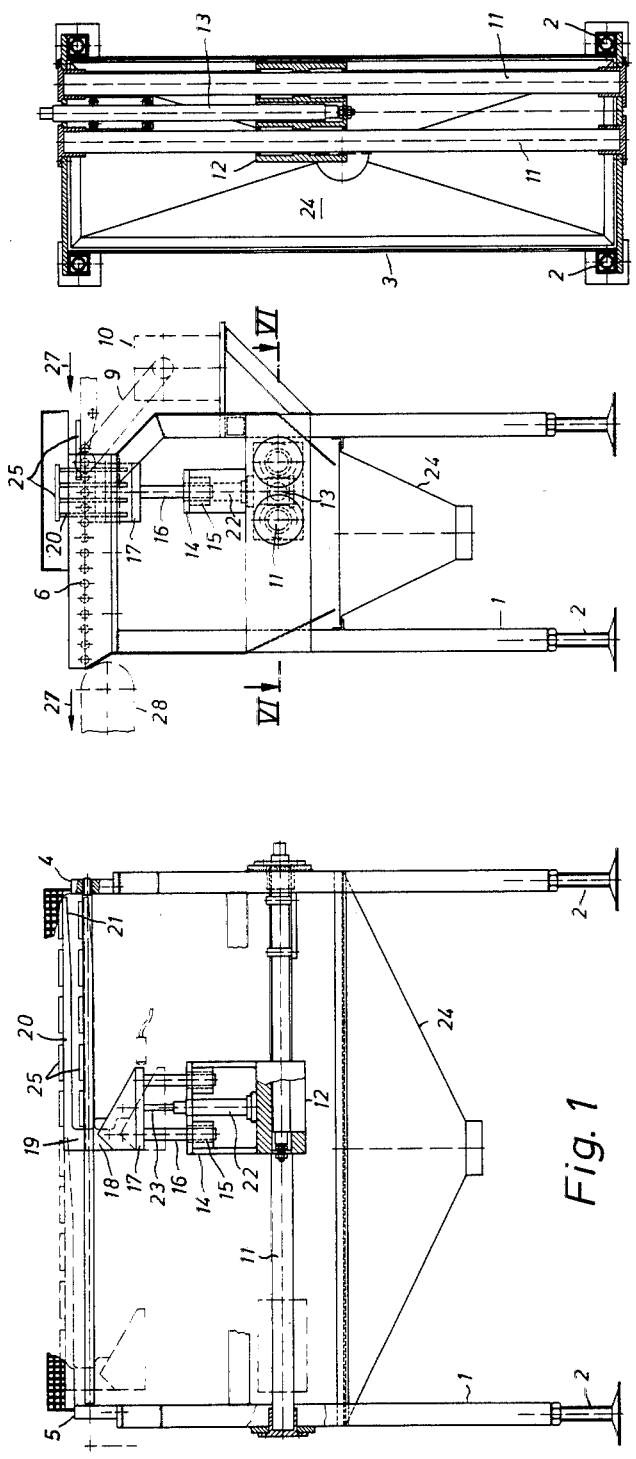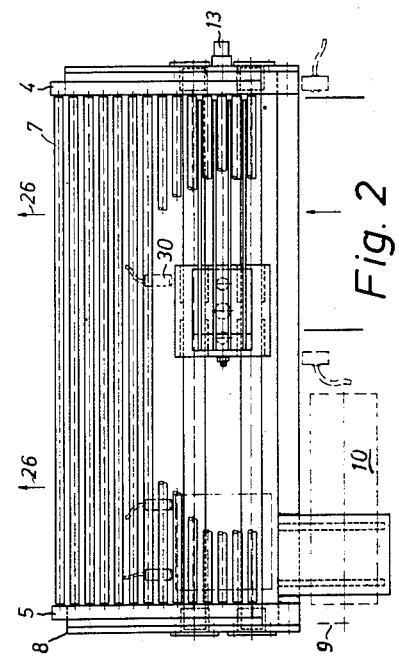

CONVEYANCE SYSTEM

This is a continuation, of application Ser. No. 187,825, filed Sept. 15, 1980, now abandoned.

BACKGROUND OF THE INVENTION

The present invention relates generally to a roller conveyer device and, more specifically, to a roller conveyor device which permits the linear conveyance velocity (i.e., the distance per unit of time at which items are conveyed) to be varied substantially independently of the quantitative conveyance rate (i.e. the number of items conveyed per given unit of time.)

Roller conveyor devices of the type in question generally include a plurality of cylindrical rollers arranged parallel to one another and designed to rotate about their axes. The axes are positioned transverse to the direction of conveyance. The rollers may be designed to spin freely so that, if the roller conveyor device is inclined sufficiently, gravity will effect the necessary movement. Alternatively the rollers may be mechanically driven. By appropriate arrangement of the rollers' axes with respect to one another, for example, by slightly displacing the axes from parallel to one another such that the axes eminate radially from a centerpoint, items may conveyed through a curve.

Although these known techniques of conveyor design are useful in many respects, great difficulty remains in designing a conveyor that operates at a relatively high linear conveyance velocity in one location and a relatively low linear conveyance velocity at a second location, while maintaining a substantially constant and predetermined quantitative conveyance delivery rate throughout the system.

An example of this problem is found in the food product processing industry, specifically in the production of cooked meat pieces such as small steaks or the like. These meat pieces are formed in shaping machines which, for reasons of simplicity, shape only a small number of pieces per operation but have a relatively high operating speed. The pieces are then sent to an oven where the operating speed is considerably lower, because it is desired to avoid a long oven length.

Conventional conveyors impose significant limitations on the extent to which the conveyor's operating speed at the shaping machines can be "geared down" to the conveyor's operating speed at the ovens. With the roller conveyor device based on the present invention, these limitations are substantially avoided with the advantage that more flexible adaptation to the working speed of the oven is attainable and shorter, more efficient ovens can be used in combination with high speed shaping machines.

The invention is, however, not limited to this kind of an application.

SUMMARY OF THE INVENTION

The conveyor system of the present invention includes a section of rollers which receives conveyed items at a first predetermined velocity and from which items are transported at a second predetermined velocity in a predetermined direction and a positioning device which moves the items laterally on the rollers, in effect taking "columns" of received items and forming them into "rows" for further conveyance. A second section of rollers has a gearing mechanism that can separately adjust the linear conveyance velocity of the items after they have been re-positioned.

The invention also includes a timing control mechanism for adjusting the rate of the positioning device's operation such that quantitative conveyance rate may be adjusted independently in various parts of the system. By forming the items into rows, if the velocity in a second section of the system is slower than the velocity in a first section, or by deforming rows of the items, if the second velocity is faster than the first, the quantitative conveyance rate can be adjusted to remain substantially constant throughout the conveyor system regardless of changes in the linear conveyance velocity from one section to another.

Thus, one object of the invention is to provide a roller conveyor device in which the effective conveyance width is adjustable.

Another object of the invention is to provide a conveyor system in which the quantitative conveyance rate can be maintained substantially uniform throughout the system, regardless of changes in the linear conveyance velocity in different parts of the system.

Still another object is to provide a conveyor system at which the quantitative conveyance rate can be varied in different parts of the system independently of the linear conveyance velocity in different parts of the system.

DESCRIPTION OF THE DRAWING

With the help of the drawing the invention will be explained in more detail with reference to the following figures:

FIG. 1 is a horizontal cross-sectional view of the roller conveyor system according to the invention, viewed in the direction of conveyance;

FIG. 2 is a top view of the device shown in FIG. 1;

FIG. 3 is a horizontal side view of the device shown in FIG. 1;

FIG. 4 is a downward cross section view taken along line IV—IV of FIG. 3;

DESCRIPTION OF THE PREFERRED EMBODIMENT

A. General Explanation of Operation

Figure 5:
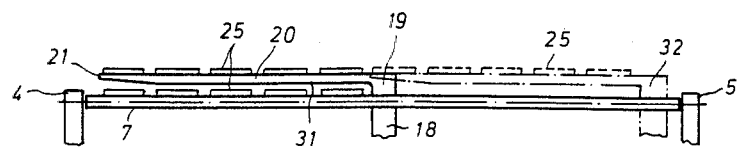
FIG. 5 shows a schematic side view, illustrating operation of the L-shaped, lifting arm.

In a preferred embodiment, the conveyor system of this invention is characterized by a motor driven, L-shaped, lifting arm having a first leg that is substantially parallel to a plane defined by the rollers' cylindrical, axes and a second leg that is substantially transverse to the plane. A drive unit raises the L-shaped arm such that the first leg, parallel to the rollers' plane, is raised between the rollers, passing through the rollers' plane.

This motion is timed with the transportation of an item on the rollers so that the L-shaped arm lifts the item above the rollers. A drive unit then translates the arm and item sideways, along the direction of the rollers' axes, and lowers the arm, depositing the item back onto the rollers. The arm is then moved back to its original position and the motion is repeated.

A special characteristic of this roller conveyor system is that the L shape of the arm provides an open space under the first leg when the arm is in the raised position. This arrangement makes possible the continuous feeding of items on the conveyor without interference or stopping due to the motion of the arm. The conveyed objects approach in a width corresponding to the extension length of the L-shaped arms in the rollers' axial direction. The objects can be picked-up and displaced laterally, yet the arm need not interfere with the transportation or "feeding" of the additional and immediately following objects, since they can pass under the first leg of the L-shaped arm. The first leg descends through the rollers outside of this feed area, and is moved back to the feed area below the surface of the rollers. Thus, the following objects are repeatedly fed to the feed area, now above the L-shaped arms, so that when the latter makes a new upward movement again the next following objects can also feed in unhindered.

The conveyor system of this invention includes a speed-related coupling for the rollers. The coupling results in an orderly "telescoping" of the conveyed objects in the direction of conveyance, especially when the decrease in the speed of the rollers is continuous. The result is a predetermined degree of relative motion between the rollers and the conveyed objects. The relative motion has the advantage of providing a self-cleaning action of the rollers such that the roller conveyance devices do not get plugged up. This advantage is of general importance, but is particularly useful when the roller conveyor device with L-shaped arms is used in the food processing industry.

The invention also includes additional support arms located next to the L-shaped arm and connected to and moved by the same drive unit that moves the L-shaped arms. These support arms extend in the axial direction of the rollers beyond the lateral movement of the L-shaped arms when in raised position and to the respective end of the rollers or to the edge of the roller conveyor device. The support arms function similarly to the L-shaped arms' first legs, which run parallel to the rollers. Acting together, the L-shaped arms' first legs and the support arms define a rib-shaped supporting table which is lifted through the surface of the rollers, raising the objects lying on that surface, moving them laterally, and depositing them off to a side of the conveyor system, in effect, selectively widening the conveyor system.

The vertical column of space extending above and below a given section of the rollers or the arms is referred to hereinafter as a "field". It is advantageous that the support arms extend over fields that are moved stepwise toward the field defined by the L-shaped arms' first legs. In this way, objects or groups of objects can be moved stepwise to the side of the conveyor. Moreover, it is not necessary that a group of objects be moved in one step up to the location in which the further or lateral transport is to take place.

The invention also provides for a lateral movement of the objects in several steps without the further transportation of the object in the conveyance direction. Oncoming objects are thus continuously moved laterally until they form a full row, and only then are the rollers in the area of this row put into motion. The speed of the operation is coordinated with the speed at which the objects are fed by the conveyor such that the whole row is transported on the conveyor system as a unit. The speed of the operation can also be adjusted and coordinated with the feed rate of the objects so as to adjust the amount of spacing between rows to a predetermined amount.

In order to assure that lateral movement of the objects by the L-shaped arms do not take place until the objects are properly in place over the L-shaped arms, it is advantageous to provide a sensing device that indicates the presence of objects above the L-shaped arms and activates the drive motor for the L-shaped arms when the objects are in place. The specific design of such sensing control may be magnetic, electronic or photoelectric as is familiar to one skilled in the art.

B. Detailed Description of the Preferred Embodiment

The conveyor device shown in FIGS. 1-4 includes a frame 1, feet 2 and diagonal trussing 3. At the upper end of the frame 1 there are located bearing plates 4 and 5, in which shafts 6 of rollers 7 rotate. The rollers 7 rotate about the shafts 6, conveying objects in a direction transverse to the shafts 6. The shafts 6 are coupled to each other by means of a drive mechanism located in a gearbox 8, best shown in FIG. 7, and driven by a drive motor 10 through a chain 9.

The frame 1 is provided with rails or rods 11 running parallel to and at a distance under the rollers 7. A slide 12 is movably held on the rods 11. The slide 12 is moved by a pneumatic cylinder 13 that is attached between the slide 12, and the frame 1. The slide 12 includes a block 14 with sliding guides 15 to direct the vertical movement of the rods 16, which hold a plate 17.

The conveyor system includes L-shaped arms 19, having first legs or horizontal arms 20 that are positioned parallel to and between the rollers 7 and second legs or vertical arms 18 that support the horizontal arms 20. The vertical arms 18 extend between the rollers 7 and the plane defined by the rollers' surface, and include a lower portion that is mounted on the plate 17.

Attached to the slide 12 is a pneumatic cylinder 22 whose piston rod 23 is connected to the plate 17 such that, when the cylinder 22 is moved, the plate 17 moves up and down with the L-shaped arms 19.

Underneath the rollers 7 and underneath the slide 12 a funnel or hopper 24 extends between the frame 1. The hopper 24 catches meat residues when the device is used for the conveyance of meat portions, e.g., steaklets 25, a few of which are shown in the representations of FIGS. 1 and 3 lying on the rollers 7 and on the arm 20.

In FIGS. 2 and 3 the conveyor direction is indicated by arrows 26 and 27. From FIG. 3 it can be seen that in the conveyance direction behind the roller conveyor drive there is a transport belt 28 that extends over the whole width of the rollers 7. The transport belt typically leads into an oven (not shown).

In the conveyance direction behind the legs 20 there is a sensing device 30 for locating the oncoming steaklets 25 and activating the drive unit, which consists of parts 11 to 17.

In a side view contrary to the conveyance direction, FIG. 5 illustrates the upper part of the conveyor device. In particular, the L-shaped arms 19 are shown with solid lines in the raised position. The L-shaped arms 19 are raised sufficiently that the lower edge of the horizontal legs 20 is above the roller 7, allowing the steaklets 25 on the rollers 7 to pass through under the arms 20.

After being raised up, the L-shaped arm 19 is moved to the right, laterally or transverse with respect to the general direction of conveyance, as indicated by the dashed line 32 in FIG. 5. From this position the arm 19 is lowered such that the steaklets 25 are set off laterally onto the open side of the rollers 7 next to the feed area underneath the legs 20. This can be seen particularly clearly in FIG. 6.

The rollers 7 have, in the area of the arms 19, the same conveyance speed as a transport belt 29 (not shown in FIGS. 1-4) for the feeding of steaklets 25. The conveyance speed is controlled in such a way that only each second oncoming row of steaklets 25 is displaced laterally by the arms 19, while the immediate rows each pass freely underneath the legs 20. At the beginning of the section of the roller conveyor device formed by the rollers 7, and as a result of the objects 25 being regrouped into approximately one-half the original number of rows, the spacing interval in the conveyance direction at this location is double the original spacing interval in the conveyance direction. In order to achieve a closing up of the rows, gearing in the gearbox 8 provides for a constant retardation of the roller speed in the conveyance direction. This causes a certain amount of slippage between the steaklets 25 and the rollers 7 which results in closing up the rows and, at the same time, has the advantage that no meat particles can stick to the rollers 7. Such particles are rubbed off and either cling to the steaklets or drop into the funnel 24.

Figure 7:
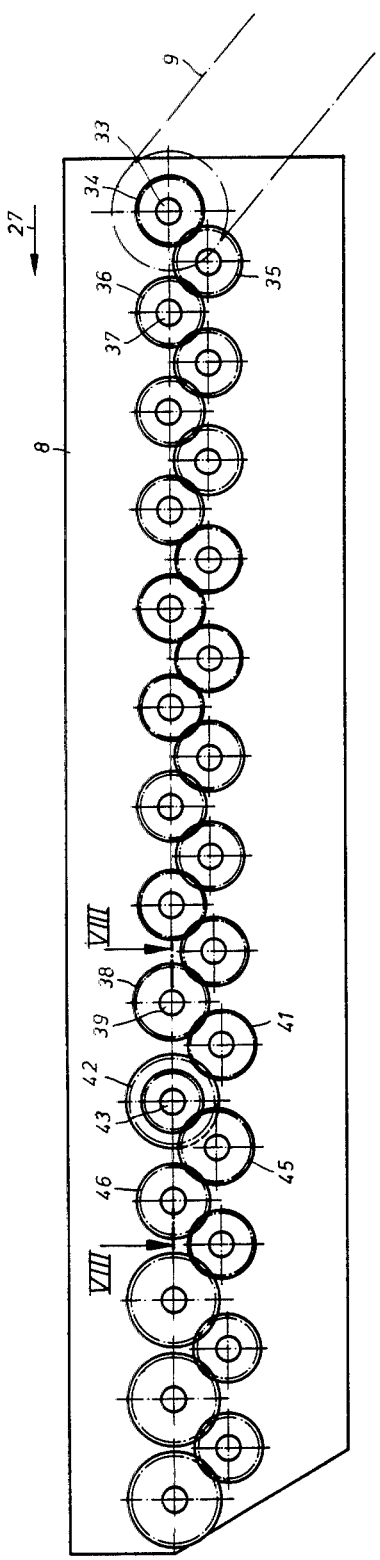
FIG. 7 is an enlarged side view of the mechanism for driving the rollers.
Figure 8:
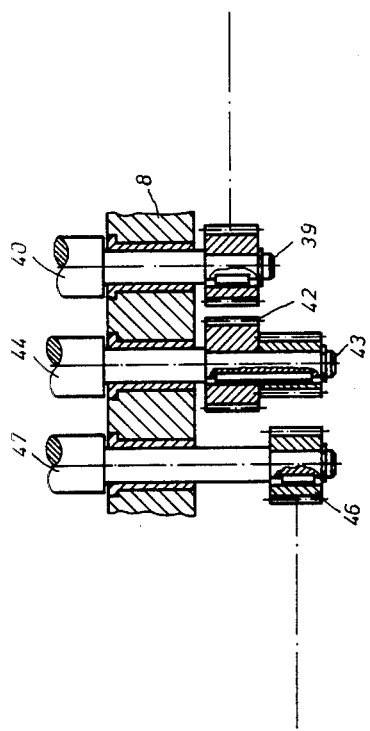
FIG. 8 is a partial downward view taken along line VIII—VIII in FIG. 7.

The gearing in the gearbox 8 is shown enlarged in FIG. 7. The chain 9 drives a shaft 33 of a roller in the first position in conveyance direction. A shaft 37 of a second roller is also driven in conveyance direction at the same time via gear wheels 34, 35 and 36, and etc. A number of shafts with rollers, seven shown in this embodiment, are driven at the same speed as the transport belt 29. Then follows a gearwheel 38 with a somewhat larger diameter, whereby the number of revolutions of a shaft 39 and an accompanying roller 40 (FIG. 8) is driven at a lower relative speed.

Gearwheel 38 acts via gearwheel 41 to drive gearwheel 42, which has a diameter further enlarged with respect to gearwheel 38, thereby driving a shaft 43 of a roller 44 (FIG. 1) at a still slower speed. By means of the difference in diameters of the gearwheels, therefore, the speed of roller 40 is decreased with respect to the preceding rollers and that of roller 44 with respect to roller 40, and etc., resulting in this case in an overall deceleration in the ratio of 1:2. Subsequent gearwheels are of a constant size so that the driving of roller 47 and subsequent wheels is done at the same speed.

Figure 6:
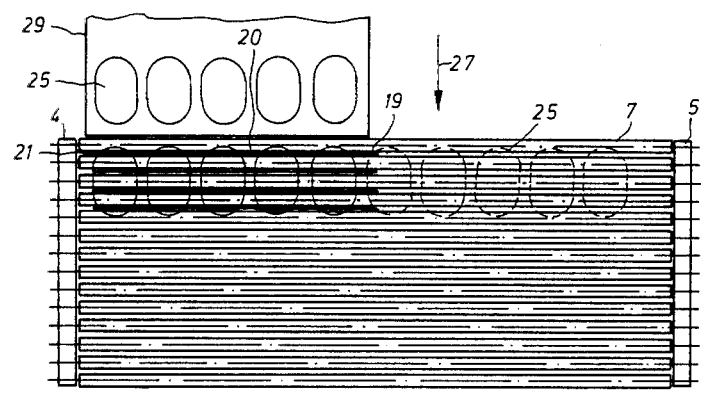
FIG. 6 is a top view of the schematic shown in FIG. 5.
Figure 9:
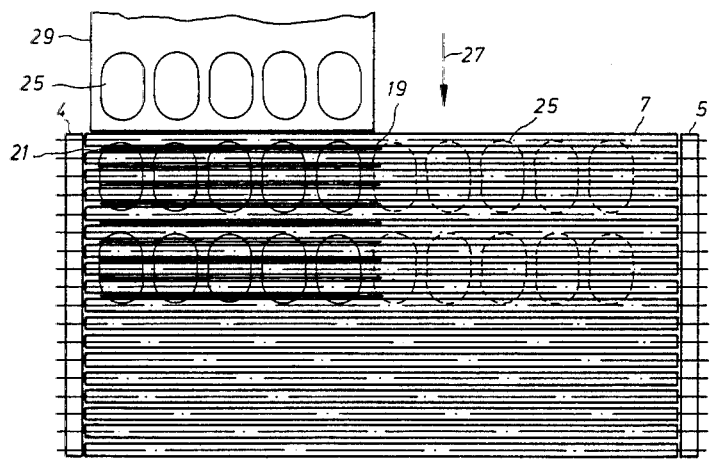
FIG. 9 is a schematic view similar to FIG. 6, showing another embodiment of the invention.

The representation in FIG. 9 corresponds essentially to that in FIG. 6, and corresponding parts are designated with the same reference numbers. The difference is that in addition to the bank of four (4) L-shaped arms 19 shown in FIG. 6, a second bank of five (5) additional L-shaped arms are provided, so that the field defined by the arms now extends over two rows of steaklets 25. With every operation cycle of the drive device for the arms 19, two rows are correspondingly set aside each time, such that this cycle occurs only half as frequently as in the embodiment shown in FIG. 6 to accomplish the same result.

Figure 10:
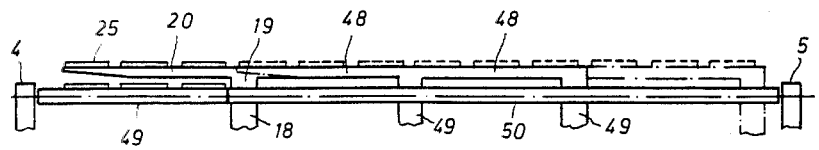
FIG. 10 is a schematic view similar to FIG. 5, showing still another embodiment of the invention.
Figure 11:
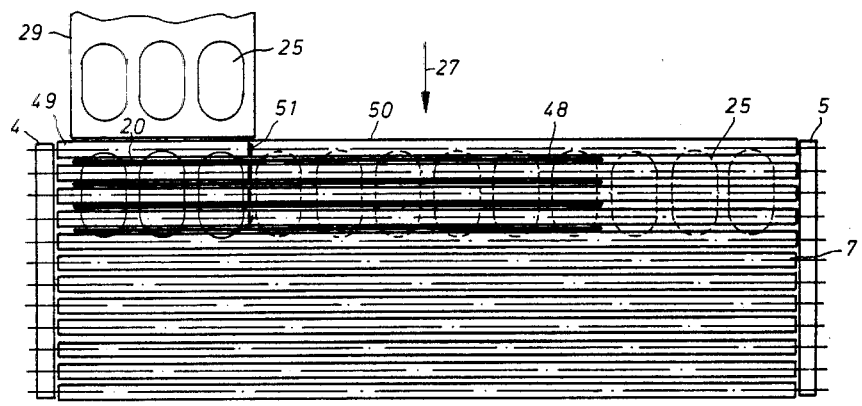
FIG. 11 is a top view of the schematic shown in FIG. 10.

FIGS. 10 and 11 correspond in their manner of presentation to FIGS. 5 and 6 and show support arms 48 to the right of the arms 18. The support arms 48, together with the legs 20, form a common upper edge on which steaklets can lie. The supports 48 are held up by additional legs 49 that are connected in the same way as the legs 18 to the pertinent drive device, e.g., mounted to the plate 17 as shown with respect to vertical legs 18 of L-shaped arm 20 in FIGS. 1 to 4.

A further characteristic of the embodiment of FIGS. 10 and 11 consists in the fact that the first four (4) rollers are divided into partial rollers 49, whose width corresponds to the width of the transport belt 29, and partial rollers 50. Between the partial rollers 49 and 50 there is narrow separation joint 51.

Through means not shown, the partial rollers 50 are stopped long enough for individual groups of objects, in this example three steaklets, to be displaced to the right through the legs 20 or the supports 48, such that a row of steaklets extends over the whole width of the transport belt. The speed of the partial rollers 49 corresponds to the speed of the conveyor belt throughout this operation. The brake for the partial rollers 50 is substantially released, and the rollers 50 are driven at the same speed as the partial rollers 49, until the row of steaklets 25 has left the area of the legs 20 or supports 48. The following rollers 7 are then coupled together by a drive similar to that previously described and shown in FIGS. 7 and 8, so that their speed gradually decreases and hence succeeding rows of steaklets close up.

Figure 12:
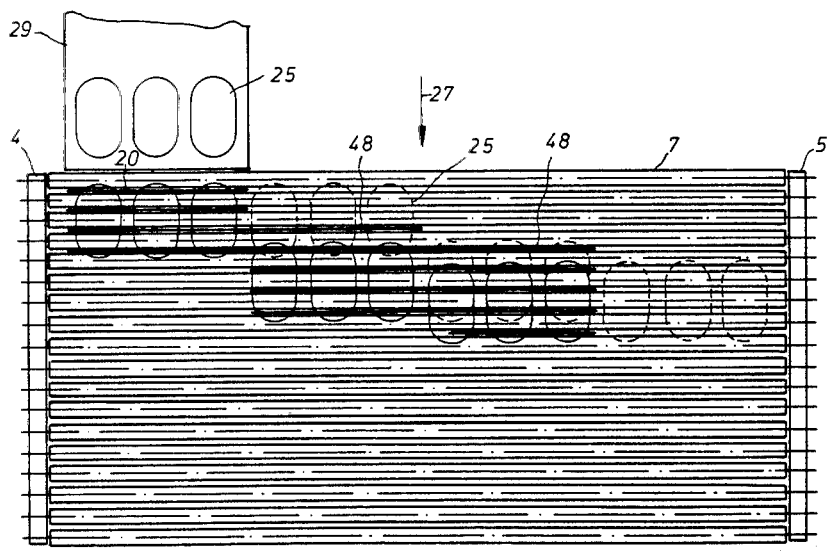
FIG. 12 is a top view similar to FIG. 11, but showing a further development of the invention.

FIG. 12 shows an embodiment that has a remote resemblance to that of FIG. 11 but basically is closer to the embodiment of FIG. 9. The deciding difference from the embodiment of FIG. 11 consists in the fact that a division of the rollers 7 is avoided because this can lead to design problems. Parts corresponding to the previous FIGS. 11 or 9 are provided with the same reference numbers. An essential characteristic of this embodiment is the fact that supports 48 again are provided to the right of the legs 20, however the supports 48 extend over two fields which are displaced with respect to the field formed by the legs 20, stepwise in the conveyance direction and away from the legs 40. Thus, each time the legs 20 drop with the accompanying supports 48, the steaklets 25 on the supports 48 are lowered onto the rollers and, for a certain time, execute a movement in the transport direction. When the next raising of the supports 48 occurs, the objects have already taken an advanced position in the transport direction which, for the purpose of the further lateral conveyance, an area of supports 48 must be available.

As already mentioned, the speed of the rollers 7 in the area of the legs 20 and the supports 48 corresponds to the feed speed of the conveyor belt 29. Thereafter the speed again drops, e.g., by means of a drive corresponding to that shown in FIGS. 7 and 8, and in this case advantageously to a speed of one-quarter of the speed of the conveyor belt 29.

The foregoing description relates to certain preferred embodiments of the invention. It should be understood that additional and alternative embodiments are possible without departing from the scope and spirit of the invention. For example, conveyor systems may be designed wherein it is advantageous to include two or more banks of independantly driven L-shaped arms 20. Or, the constant speed reduction described and shown in reference to FIG. 8 may be accomplished using a greater or lesser number of gearwheels. Therefore, it is to be understood that this invention is limited only by the following claims and their equivalents.

What is claimed is:

1. In a roller conveyor device for transporting items, said roller conveyor device including sensing and control means for determining when said items are in a predetermined position relative to the roller conveyor device and for actuating operation of the roller conveyor device once the items are in the predetermined position, the improvement of said roller conveyor device by incorporating therein means for adjusting the conveyance velocity at which lateral rows of items are conveyed from a first conveyance velocity to a second conveyance velocity which is lower than the first conveyance velocity, comprising in combination:
(a) first rollers for receiving rows of items transported in a predetermined direction of conveyance at said first predetermined conveyance velocity;
(b) L-shaped arms, each said arm having at least one leg that runs essentially parallel to the first rollers and at least one second leg that runs transverse to the plane defined by the first rollers, said arms being mounted on a movable drive unit which is located underneath the first rollers, said movable drive unit being mounted, in turn, on guide rails that are substantially parallel to said first rollers, said movable drive unit defining means for cyclically moving said arms such that the one legs of the L-shaped arms from a start position are simultaneously lifted up through the first rollers to a predetermined height above the first rollers, then moved in a direction substantially parallel to the first rollers and away from their free ends over a distance according to their length, then lowered below the upper edge of the first rollers and then returned in this height to the start position underneath the first rollers and thereby lifting a first row of said items from said first roller means, then moving said first row of said items laterally with respect to the direction of conveyance of said rows of items over a distance according to the length of the first row and then lowering the first row of items onto the first roller means besides a second row of items having continued to be transported to and received by the first roller means in the meantime;
(c) said sensing and control means being located in the area of the L-shaped arms and actuating the said movable drive unit for the L-shaped arms in its start position once the conveyed objects have reached the predetermined location;
(d) second rollers located in the direction of conveyance from the first rollers for simultaneously receiving said first and second rows of items;
(e) the second rollers being coupled by a gearbox which adjusts the speed of the second rollers downward stepwise from roller to roller in the conveyance direction of the first rollers adjacent the L-shaped arms and so adjusting the said first conveyance velocity to said lower second conveyance velocity and thereby adjusting the spacing between the rows of items in the direction of conveyance.

2. The improvement as described in claim 1 wherein the fraction of the speed substantially corresponds to the ratio of the distance of the L-shaped arms' motion parallel with the first rollers to the full length of the first rollers.

3. The improvement as described in claim 1 further comprising support arms extending substantially parallel to the one leg of the L-shaped arms and attached to the movable drive unit.

4. The improvement as described in claim 3 wherein the support arms have a length which is parallel to the first rollers and essentially corresponds to a whole-number multiple of the length of the one leg of the L-shaped arms.

5. The improvement as described in claim 4 wherein the support arms include upper edges that form extensions of the one legs of the L-shaped arms that extend parallel to the first rollers.

6. The improvement as described in claim 3 wherein the support arms extend over fields which are displaced to the field formed by the one legs of the L-shaped arms, said displacement being stepwise in the conveyance direction laterally away from the field formed by the said legs.

7. The improvement as described in claim 1 wherein the second rollers adjacent the one legs of the L-shaped arms define first partial rollers and the rollers away from the one legs of the L-shaped arms define second partial rollers, said second partial rollers including braking and drive means for selectively stopping said second partial rollers or driving them at the same speed as said first partial rollers, with the ratio of the drive time to the stopping time being proportional to the length of the one leg to the length of the supports, and with the braking occurring shortly before the lowering of the L-shaped arms.

8. The improvement as described in claim 1 further including a second conveyor device located in conveyance direction upstream of the first roller means and in lateral direction adjacent the one legs, extending in the conveyance direction and having a width corresponding to the length of the one legs of the L-shaped arms.

9. In a roller conveyance device for transporting items, said roller conveyor device including sensing and control means for determining when said items are in a predetermined position relative to the roller conveyor device and for actuating operation of the roller conveyor device once the items are in the predetermined position, the improvement of said roller conveyor device by incorporating therein means for adjusting the conveyance velocity at which lateral rows of items are conveyed from a first conveyance velocity to a second conveyance velocity which is lower than the first conveyance velocity, comprising in combination:
(a) first rollers for receiving rows of items transported in a predetermined direction of conveyance at said first predetermined conveyance velocity;
(b) L-shaped arms, each said arm having at least one leg that runs essentially parallel to the first rollers and at least one second leg that runs traverse to the plane defined by the first rollers, said arms being mounted on a movable drive unit which is located underneath the first rollers, said movable drive unit being mounted, in turn, on guide rails that are substantially parallel to said first rollers, said movable drive unit defining means for cyclically moving said arms such that the one legs of the L-shaped arms from a start position are simultaneously lifted up through the first rollers to a predetermined height above the first rollers, then moved in a direction substantially parallel to the first rollers and away from their free ends over a distance according to their length, then lowered below the upper edge of the first rollers and then returned in this height to the start position underneath the first rollers and thereby lifting a first row of said items from said first roller means, then moving said first row of said items laterally with respect to the direction of conveyance of said rows of items over a distance according to the length of the first row and then lowering the first row of items onto the first roller means besides a second row of items having continued to be transported to and received by the first roller means in the meantime;

(c) second rollers located in the direction of conveyance from the first rollers for receiving rows of items from the first rollers, said second rollers having first partial rollers positioned adjacent the one legs of the L-shaped arms and second partial rollers positioned away from the one legs of the L-shaped arms, said second partial rollers including braking and drive means for selectively stopping said second partial rollers or driving them at the same speed as said first partial rollers, the braking means stopping said second partial rollers during the action of the L-shaped arms until the rows of items are placed over the whole width of the second rollers and the drive means thereafter driving said second partial rollers until the rows of items over the whole width of the second rollers are conveyed off the first and second partial rollers.

(d) said sensing and control means being located in the area of the L-shaped arms and actuating the said movable drive unit for the L-shaped arms in its start position once the conveyed objects have reached the predetermined location and actuating the braking and driving means of the second partial rollers;

(e) the second rollers being coupled by a gearbox which adjusts the speed of the second rollers downward stepwise from roller to roller in the conveyance direction of the first rollers adjacent the L-shaped arms and so adjusting the said first conveyance velocity to said lower second conveyance velocity and thereby adjusting the spacing between the rows of items in the direction of conveyance.

* * * * *